United States Patent
Desai et al.

(10) Patent No.: US 12,010,746 B2
(45) Date of Patent: Jun. 11, 2024

(54) MULTI-LINK DEVICE CLASSIFICATION BASED NEIGHBOR DISCOVERY

(71) Applicant: Cisco Technology, Inc., San Jose, CA (US)

(72) Inventors: Vishal Satyendra Desai, San Jose, CA (US); Gautam D. Bhanage, Milpitas, CA (US); Benjamin Jacob Cizdziel, San Jose, CA (US); Santosh Babaji Kulkarni, San Jose, CA (US)

(73) Assignee: Cisco Technology, Inc.

( * ) Notice: Subject to any disclaimer, the term of this patent is extended or adjusted under 35 U.S.C. 154(b) by 462 days.

(21) Appl. No.: 17/167,985

(22) Filed: Feb. 4, 2021

(65) Prior Publication Data
US 2022/0248486 A1   Aug. 4, 2022

(51) Int. Cl.
| | |
|---|---|
| *H04W 76/15* | (2018.01) |
| *H04W 8/24* | (2009.01) |
| *H04W 72/0453* | (2023.01) |
| *H04W 72/23* | (2023.01) |

(52) U.S. Cl.
CPC ............ *H04W 76/15* (2018.02); *H04W 8/24* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | |
|---|---|---|
| 9,843,965 B2 | 12/2017 | Pandey et al. |
| 2015/0208330 A1 | 7/2015 | Park et al. |
| 2019/0268956 A1 | 8/2019 | Xiao et al. |
| 2020/0221545 A1* | 7/2020 | Stacey ............... H04W 48/16 |
| 2020/0305008 A1 | 9/2020 | Henry et al. |
| 2021/0337613 A1* | 10/2021 | Seok .................. H04W 48/16 |
| 2022/0110123 A1* | 4/2022 | Adachi ............... H04W 76/14 |
| 2022/0167256 A1* | 5/2022 | Kneckt ............. H04W 12/037 |

(Continued)

FOREIGN PATENT DOCUMENTS

WO   2020091332 A1   5/2020

OTHER PUBLICATIONS

Alfred Asterjadhi et al., IEEE P802.11 Task Group BE (EHT) Meeting Update, Sep. 2020, 7 pages.

(Continued)

*Primary Examiner* — Srinivasa R Reddivalam
(74) *Attorney, Agent, or Firm* — Merchant & Gould P.C.

(57) ABSTRACT

Optimization of radio communications of a wireless network of a local site may be provided. A probe frame or an association frame may be received from a Client Device (CD) operating in the local site that identifies at least one operating class and Multi-Link (ML) capability information of the CD. Channel information of at least one Access Point (AP) having ML capability in the local site may be embedded in a probe response frame or in an association response frame based on the at least one operating class and the ML capability information of the CD. The probe response frame or the association response frame that includes the channel information of the at least one AP having ML capability in the local site may be transmitted, as unicast, to the CD.

20 Claims, 5 Drawing Sheets

(56) References Cited

U.S. PATENT DOCUMENTS

2022/0287122 A1\* 9/2022 Wang ..................... H04W 8/22
2023/0082270 A1\* 3/2023 Guo .................. H04W 74/0808
　　　　　　　　　　　　　　　　　　　　　　　370/329

OTHER PUBLICATIONS

Jarkko Kneckt et al., CR for Reduced Neighbor Report, IEEE 802.11-19/488r2, Nov. 2020, 5 pages. http://www.ieee802.org/11/Reports/tgbe_update.htm.
Santosh Pandey, FILS Reduced Neighbor Report Element, IEEE 802.11-12/1054r2, Sep. 2012, 20 pages.

\* cited by examiner

MULTI-LINK DEVICE CLASSIFICATION BASED NEIGHBOR DISCOVERY

TECHNICAL FIELD

The present disclosure relates generally to optimizing communications in a wireless network.

BACKGROUND

When configuring a wireless network, Access Points (APs) having similar or varying physical and operational capabilities may be deployed at particular locations in attempting to serve Client Devices (CDs) of the wireless network. For example, APs may be deployed to form a wireless network according to a map layout and anticipated types of CDs utilizing APs of the wireless network. AP neighbor reports may be used to determine capabilities of deployed APs and provide insights about an operational condition of the wireless network.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
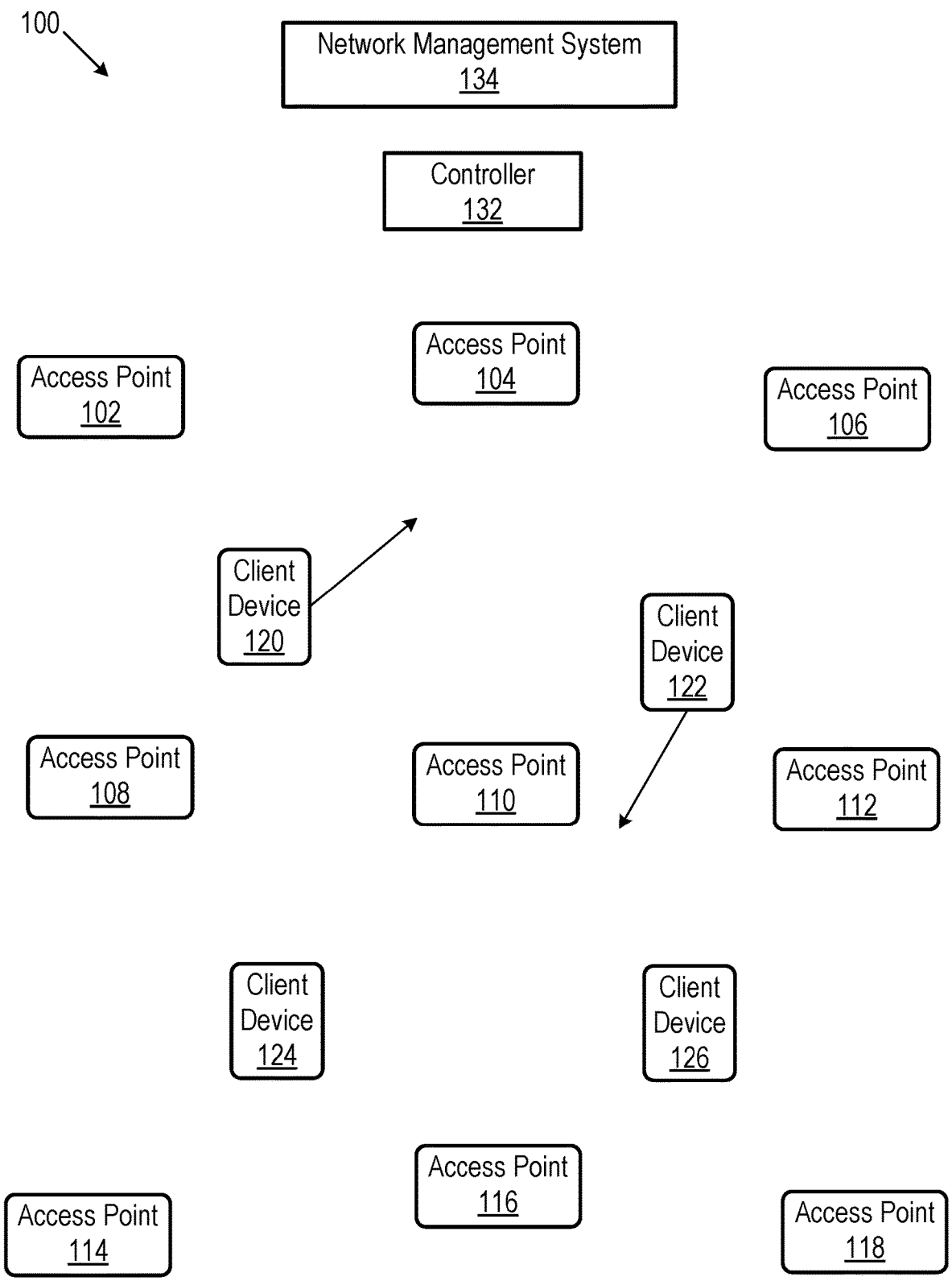
FIG. 1 is a block diagram of wireless network.

Optimization of radio communications of a wireless network of a local site may be provided. A probe frame or an association frame may be received from a Client Device (CD) operating in the local site that identifies at least one operating class and Multi-Link (ML) capability information of the CD. Channel information of at least one Access Point (AP) having ML capability in the local site may be embedded in a probe response frame or in an association response frame based on the at least one operating class and the ML capability information of the CD. The probe response frame or the association response frame that includes the channel information of the at least one AP having ML capability in the local site may be transmitted, as unicast, to the CD.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Institute of Electrical Engineers (IEEE) 802.11 enables Access Points (APs) to transmit Reduced Neighbor Reports (RNRs) that provide operational information about neighboring APs. An RNR may be broadcast by an AP and include a list of operating classes and channels along with Target Beacon Transmission Time (TBTT) information reported by neighbor APs. When a Client Device (CD) transmits a probe frame that includes supported operating classes, an RNR may be provided to the CD by an AP that is associated with the CD. The RNR may include information of one or more neighbor APs whose current operating class supports operating classes of the CD. A CD may use a received RNR for AP discovery as part of its scanning and roaming operations.

The announcement of Wireless Fidelity (Wi-Fi) 6E offers newly opened 6 Gigahertz (GHz) spectrum for Wi-Fi operation. The 6 GHz spectrum allocates approximately 1200 Megahertz (MHz) of frequencies which may encompass as many as 59 wireless channels that may be available for wireless operations. While the wider 6 GHz spectrum provides significant capacity for high density deployments and multimedia devices, a unique set of challenges is presented for AP discovery by wireless clients due in part to the high number of available wireless channels.

Adding an additional layer of complexity, IEEE 802.11be (Wi-Fi 7) has introduced a concept of Multi-Link (ML) capable devices that are able to associate to multiple links on multiple bands and frequency domains. With the new capabilities envisioned by IEEE 802.11be combined with the newly available 6 GHz spectrum, existing methods used by CDs to scan or transmit broadcast probes on wireless channels may create significant overhead for the CDs and the wireless network.

The present disclosure provides infrastructure-guided supervised AP discovery in part to facilitate new capabilities envisioned by IEEE 802.11be and the 6 GHz spectrum. As described further below, infrastructure-guided supervised AP discovery may provide AP neighbor details to CDs that may enable the CDs to reduce an amount of time required to scan for APs and/or associate with a target AP. In some aspects, neighbor details may be compiled for CDs based on capabilities and/or other operational parameters of each CD. The compiled neighbor details may be provided to each CD as a unicast transmission. Since neighbor details may be tailored for each CD, an amount of scanning time required by a CD to discover APs may be reduced resulting in more timely associations. Additionally, bandwidth may be preserved in a wireless environment since neighbor details may be transmitted as unicast to each CD as compared to larger amounts of bandwidth required for providing neighbor details with broadcast or multicast transmissions.

According to aspects, infrastructure-guided supervised AP discovery may compile different types of neighbor details that may be tailored for a particular CD based in part on capabilities of the particular CD. In one aspect, infrastructure-guided supervised AP discovery may provide smart or client-specific RNRs tailored for different types of CDs including ML capable CDs and CDs without ML capability. Each client-specific RNR may be provided to include tailored information for a CD based in part on a likelihood of the CD associating with a neighbor AP. The client-specific RNR may be transmitted to a particular CD as a unicast probe response or a unicast association response for example.

In another aspect, infrastructure-guided supervised AP discovery may utilize a channelization Informational Element (IE) to tailor neighbor discovery information for different types of CDs including ML capable CDs and CDs without ML capability. The channelization IE may be provided to include a channel list indicating which channels are supported by ML capable APs in a local site according to each operating class supported by a particular CD. In some aspects, one or more of a client-specific RNR and a channelization IE may dynamically be provided to a particular CD.

FIG. 1 shows a block diagram of an exemplary wireless network 100 for providing infrastructure-guided supervised AP discovery for CDs. For the example of FIG. 1, wireless network 100 (e.g., a Wireless Local Area Network (WLAN)) includes a plurality of APs including AP 102, AP 104, AP 106, AP 108, AP 110, AP 112, AP 114, AP 116, and AP 118. The layout of APs of wireless network 100 may be representative of a local site, such as a building floor or other representative space for example, that includes different areas separated by walls or other physical barriers and may anticipate a client base that may or may not include fluctuating numbers and/or locations of CDs. For illustration purposes, a number of exemplary CDs (CD 120, CD 122, CD 124, and CD 126) are located throughout the wireless network 100 which are shown in relation to AP 102, AP 104, AP 106, AP 108, AP 110, AP 112, AP 114, AP 116, and AP 118.

AP 102, AP 104, AP 106, AP 108, AP 110, AP 112, AP 114, AP 116, and AP 118 may be networking hardware devices having varying serving capabilities that enable CD 120, CD 122, CD 124, and CD 126 to connect to wireless network 100. APs and CDs may be distributed throughout wireless network 100 and may include multi-radio or single-radio devices with ML capabilities and/or legacy capabilities. Moreover, one or more of CD 120, CD 122, CD 124, and CD 126 may be moving and roaming within wireless network 100 (shown by directional arrows in FIG. 1 relative to CD 120 and CD 122 as examples).

Depending on the network configuration, one or more APs may be configured with two radio interfaces where the first radio interface supports the 5 GHz frequency band and the second radio interface is a flexible radio interface (e.g., XOR radio) that may dynamically switch between different frequency bands (e.g., 2.4 GHz, 5 GHz, 6 GHz, etc.) to transmit signals using a desired frequency band (e.g., either 2.4 GHz, 5 GHz, 6 GHz, etc.). Depending on a type of AP configuration, radios of the AP may be active simultaneously on the same frequency band or on different frequency bands. For example, an XOR radio and a dedicated 5 GHz radio of an AP may simultaneously or non-simultaneously transmit signals using different channels of the 5 GHz frequency band.

A controller 132 may manage one or more of AP 102, AP 104, AP 106, AP 108, AP 110, AP 112, AP 114, AP 116, and AP 118. Controller 132 may be provisioned as a master AP, a cloud-based device, a separate device, and/or otherwise configured. In some examples, and as described further below, controller 132 may be used to generate client-specific RNRs and/or channelization IEs tailored according to particular configurations and/or capabilities of CDs of wireless network 100. CD 120, CD 122, CD 124, and CD 126 may comprise any type of device capable of accessing wireless network 100 such as, but is not limited to, a laptop computer, a tablet computer, a smart phone, wearable computing device, an Internet-of-Things (IoTs) device, among other devices capable of accessing and using wireless network 100 via one or more APs.

In some examples, APs and CDs may comprise multiple radios or single radios. For example, CD 120 may have multiple radios and Simultaneous Transmit Receive (STR) capability (e.g., a multi-radio STR) or may have multiple radios without having STR capability (e.g., a multi-radio non-STR). In other examples, CD 120 may comprise a single-radio device. For example, CD 120 may have a single-radio with enhanced capabilities (Enhanced Single Radio (ESR)) or a single-radio without enhanced capabilities (Single Radio (SR)).

Network devices having ML capability enables these devices to transmit on at least two different links established during ML set up. However, depending on the ML capabilities of each network device, a number of links that may be active at a same time varies. For example, if CD 120 includes single-radio capabilities, CD 120 may only be active on one link at a time and thus, only capable of transmitting data on one link at a time. Alternatively, if CD 120 is a multi-radio with or without STR capabilities, CD 120 may be active on and thus transmit on two different links at the same time. When transmitting on two different links simultaneously, in some examples, CD 120 may transmit on two links within a same Radio Frequency (RF) band (e.g., transmit on two different channels within one of 2.4 Ghz, 5 Ghz, or 6 Gz bands). In other examples, CD 120 may transmit on two links within different RF bands (e.g., transmit on a channel of 5 GHz band and on a channel of 6 GHz band). In some aspects, each CD may transmit operational capabilities including one or more operating classes and ML capabilities as part of an IE included in a probe frame or an association frame, as described further below.

In some examples, a network management system 134 may manage and/or control aspects of one or more wireless networks including wireless network 100. For example, network management system 134 may be used to generate client-specific RNRs and/or channelization IEs tailored according to particular configurations and/or capabilities of CDs of wireless network 100. One non-limiting example of network management system 134 is the Cisco® Digital Network Architecture Center (DNA-C).

In some aspects, network management system 134 and/or controller 132 may store AP discovery information, including neighbor AP operational parameters and/or CD operational parameters for use in tailoring one or more of client-specific RNRs or channelization IEs to be transmitted as unicast frames from an AP to an associated CD. As described below with respect to FIGS. 2 and 3, network management system 134 or controller 132 may collect and compile operational information of CDs and APs of a local site (e.g., wireless network 100) as part of dynamically generating client-specific RNRs or channelization IEs. For example, client-specific RNRs or channelization IEs may be provided according to capabilities and/or other operational parameters (e.g., ML capability, directional motion, history of association, etc.) of CDs that are identified via received probe frames and/or association frames. As CDs transmit probe frames or association frames, network management system 134 or controller 132 may collect and compile identifying parameters of each CD (e.g., Media Access Control (MAC) address, manufacturer/model, channel(s), operating class, ML IE, etc.) as well as collecting and compiling identifying parameters of each associated AP and/or neighboring APs of the local site.

In other embodiments of the disclosure, rather than APs, devices may be used that may be connected to a cellular network that may communicate directly and wirelessly with end use devices to provide access to wireless network 100 (e.g., Internet access). For example, these devices may comprise, but are not limited to, eNodeBs (eNBs) or gNodeBs (gNBs). A cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications. While FIG. 1 depicts a certain number of network devices, the wireless network 100 may include additional or fewer numbers of network devices including different numbers of controllers, APs, CDs, etc.

The elements described above of wireless network 100 (e.g., APs, CDs, controller 132, network management system 134) may be practiced in hardware and/or in software (including firmware, resident software, micro-code, etc.) or in any other circuits or systems. The elements may be practiced in electrical circuits comprising discrete electronic elements, packaged or integrated electronic chips containing logic gates, a circuit utilizing a microprocessor, or on a single chip containing electronic elements or microprocessors. Furthermore, the elements may also be practiced using other technologies capable of performing logical operations such as, for example, AND, OR, and NOT, including but not limited to, mechanical, optical, fluidic, and quantum technologies. As described in greater detail below with respect to FIG. 5, the elements may be practiced in a computing device 500.

Figure 2:
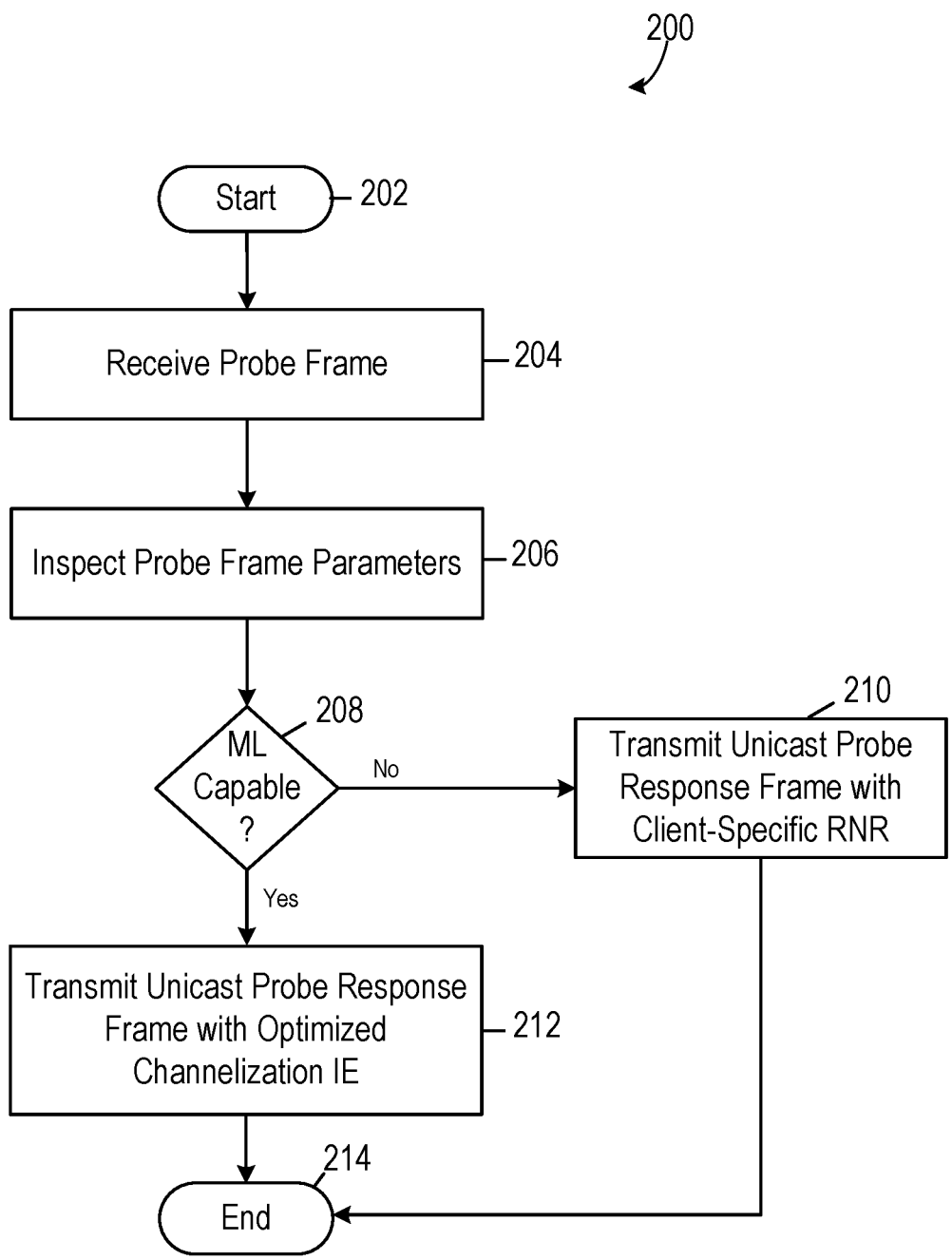
FIG. 2 is a flow chart of a method for optimizing Access Point (AP) neighbor discovery for Client Devices (CDs) in a local site.

FIG. 2 is a flow chart setting forth the general stages involved in a method 200 for optimizing AP neighbor discovery for CDs in a local site (e.g., wireless network 100) that may include one or more CDs having or not having ML capabilities. Method 200 may be implemented using computing device 500 (e.g., controller 132 or network management system 134) as described in more detail below with respect to FIG. 5. For example, controller 132 or network management system 134 may be used to provide one or more of client-specific RNRs and channelization IEs for CDs of wireless network 100. Ways to implement the stages of method 200 will be described in greater detail below.

Method 200 begins at block 202 and proceeds to stage 204 where method 200 operates to receive probe frames from one or more CDs. For example, one or more of AP 102, AP 104, AP 106, AP 108, AP 110, AP 112, AP 114, AP 116, and AP 118 may receive probe frames transmitted from one or more of CD 120, CD 122, CD 124, and CD 126 while operating within the local site. For example, one or more CDs may transmit probe frames that include identifying parameters (e.g., MAC address, manufacturer/model, supported channel(s), operating class, ML IE, etc.) of the one or more CDs into wireless network 100. The ML IE may be used to identify ML capability and/or other RF capability information of the one or more CDs. For example, an ML IE of an ML capable CD may carry single-radio or multi-radio capabilities of the CD including whether capabilities include STR, non-STR, ESR, SR, etc.

APs receiving probe frames may forward any pertinent identification and/or operational information including ML IEs of CDs to controller 132 or network management system 134. Controller 132 or network management system 134 may enter parameters of the probe frames transmitted by each CD in memory storage (e.g., database 525 of FIG. 5). For example, controller 132 or network management system 134 may store a MAC address, Internet Protocol (IP) address, security context and associations, Quality of Service (QoS) contexts, an associated AP, neighbor AP(s), current channel(s) in use, an ML IE, etc. for each CD of the local site.

Controller 132 or network management system 134 may use the stored information to forward frames and manage traffic for each CD as part of maintaining seamless associations from one AP to a different AP with minimal latency. In some aspects, a Neighbor Discovery Protocol (NDP) process may be used to identify AP capabilities and coverage for the local site using NDP packets that may include transmit power, supported and/or recently used channels, ML capabilities, operating classes, and/or other operational parameters. Identified AP capabilities and coverages for the local site may be used in generating client-specific RNRs and/or channelization IEs.

At stage 206, method 200 inspects probe frame parameters to determine capabilities of each CD. For example, at stage 206, method 200 may rely on controller 132 or network management system 134 to inspect probe frame parameters to determine if a CD is capable of ML operation. According to an aspect, an ML IE may be included with a probe frame that carries ML capability and/or other RF capability information of a corresponding CD.

In one aspect, at stage 206, method 200 may use controller 132 or network management system 134 to inspect an ML IE of a probe frame to identify whether a transmitting CD is ML capable and/or a type of ML RF capability. For example, at stage 206, method 200 may use controller 132 or network management system 134 to inspect ML IEs of probe frames to identify whether a CD is ML capable and/or has at least one STR capability, no STR capability, ESR capability, and/or SR capability. In some examples, the ML IE may be set to zero which identifies that a corresponding CD may not be ML capable (e.g., the CD has legacy capabilities).

STR capable ML devices may contain multiple radio interfaces or radios (e.g., dual 4×4 5 GigaHertz (GHz) radios with single 2.4 GHz radio and/or single 6 GHz radio), wherein each radio may operate independently of other radios. An N×N radio interface may be configured with N transmitters and N receivers. STR capable ML devices may have the capability to simultaneously transmit and receive signals using multiple radios. STR capable ML devices may utilize multiple radios to maximize performance given the independent radio operation. ML capable devices without STR may contain multiple radios that may be incapable of operating independently. ML capable devices without STR may support simultaneous transmit functions or simultaneous receive functions on multiple radios but do not support simultaneous transmit and receive functions on multiple radios. For example, an ML capable CD without STR may use multiple radios for simultaneous transmission or simultaneous reception.

ML devices with ESR (e.g., 2×2 devices) may be capable of concurrently monitoring two links but may only use a single link at a time when transmitting or receiving RF signals. An ML device with ESR may be able to dynamically switch from one link to another link. ML devices with SR (e.g., 2×2 devices) may be capable of using a single link at a time when transmitting or receiving RF signals. Compared to an ML device with ESR, an ML device with SR may be unable to dynamically switch from one link to another link.

With continuing reference to FIG. 2, at decision 208, if method 200 determines that a CD is not ML capable after inspecting the probe frame parameters, method 200 proceeds to stage 210 and transmits, as unicast, a probe response frame that includes a client-specific RNR tailored for a particular CD based in part on the probe frame parameters and the method 200 then ends at stage 214. For example, at stage 210, method 200 may utilize an AP that is associated with a CD to transmit, as unicast, a probe response frame with a client-specific RNR to the CD. In some aspects, a client-specific RNR includes AP discovery information based on the received probe frame parameters (e.g., operational class, ML capability, number of radios, etc.) and/or a likelihood that the CD may associate with a neighbor AP. A likelihood of association may be based on multiple factors including a current location of a CD, a trajectory of the CD, an operational state of the CD, association history, etc.

According to an aspect, a client-specific RNR may be tailored to include one or more of a Basic Service Set Identifier (BSSID), a Target Beacon Transmission Time (TBTT), and frequency information of a different frequency band of a neighbor AP based on a likelihood of the CD associating with the neighbor AP using the different frequency band. For example, a CD currently associated with an AP on the 5 GHz frequency band may receive a client-specific RNR that includes a BSSID, TBTT, and relevant channel information of a neighbor AP operating in the 6 GHz frequency band.

The CD may use the client-specific RNR to reduce an amount of time to scan channels of the 6 GHz frequency band since the channel information of the 6 GHz frequency band is included in the client-specific RNR. In some aspects, a client-specific RNR may be further tailored for a particular CD based on at least one of a Quality of Service Basic Service Set (QBSS) of at least one neighbor AP, a current traffic distribution of the at least one neighbor AP, a configured data rate of the at least one neighbor AP, or QoS requirements of the particular CD.

With continued reference to FIG. 2, at decision 208, if method 200 determines that a CD is ML capable after inspecting the probe frame parameters, method 200 proceeds to stage 212 and transmits, as unicast, a probe response frame that may include an optimized channelization IE tailored for the ML capable CD according to the probe frame parameters, before the method 200 ends at stage 214. For example, at stage 212, method 200 may utilize an AP that is associated with the ML capable CD to transmit, as unicast, a probe response frame with an optimized channelization IE tailored according to the capabilities of the ML capable CD.

Figure 4:
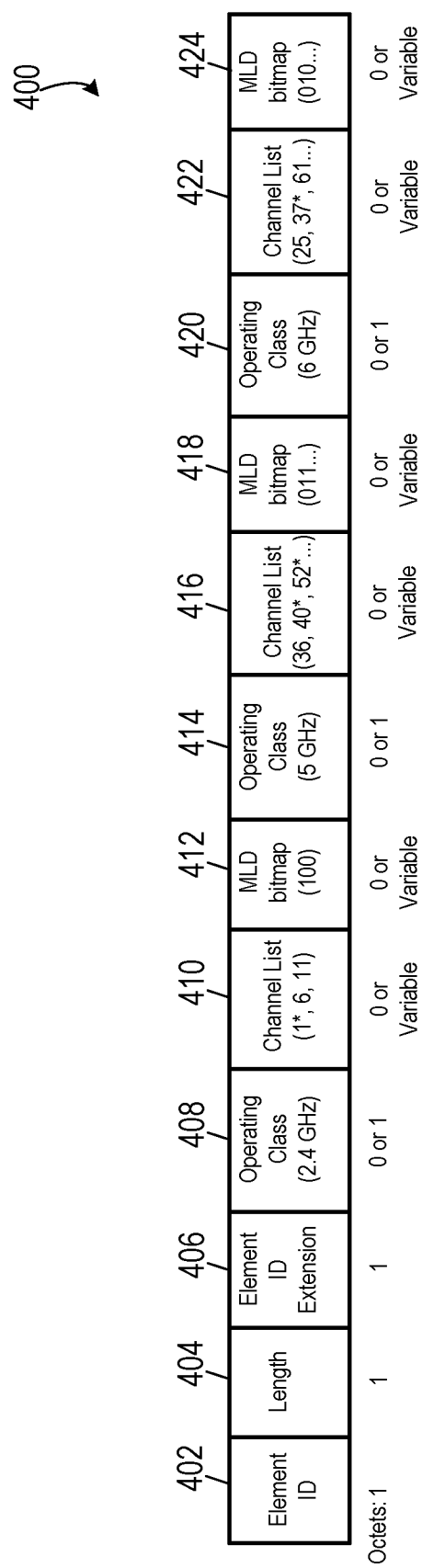
FIG. 4 depicts an exemplary channelization Information Element (IE)

In some aspects, method 200 may use the network management system 134 or controller 132 to compile the optimized channelization IE for a unicast transmission to an ML capable CD (see example of FIG. 4). According to an aspect, an optimized channelization IE may include embedded channel information comprising at least one of: a channel list that identifies channels of a first frequency band and an ML channel bitmap for the first frequency band; a channel list that identifies channels of a second frequency band and an ML channel bitmap for the second frequency band; or a channel list that identifies channels of a third frequency band and an ML channel bitmap for the third frequency band. A channelization IE may be representative of a plurality of APs having the same or differing capabilities in a local site.

According to an aspect, method 200 may tailor an optimized channelization IE for an ML capable CD to provide frequency separation between supported channels to reduce co-channel interference between the supported channels when the ML capable CD includes at least one of multi-radio with STR capability or without STR capability.

As described above with reference to method 200, in some aspects, controller 132 or network management system 134 may provide either a client-specific RNR or a channelization IE to a CD based on ML capability of the CD (e.g., provide a client-specific RNR if not ML capable and channelization IE if ML capable).

In other aspects, controller 132 or network management system 134 may dynamically provide one or more of a client-specific RNR and a channelization IE to particular CDs. For example, controller 132 or network management system 134 may provide an ML capable CD with a client-specific RNR in addition or alternatively to a channelization IE to account for directional motion and likelihood of associating to an ML capable AP of a local site. In some aspects, controller 132 or network management system 134 may provide the client-specific RNR to the ML capable CD to provide more details about neighboring BSSs in range of the ML capable CD. For example, a single-radio ML capable CD may benefit from using a client-specific RNR during roaming operations to gain insight about a neighboring AP's TBTT alignment.

In other aspects, controller 132 or network management system 134 may provide a non-ML capable CD with a channelization IE in addition or alternatively to a client-specific RNR. Since a channelization IE may be provided to include a limited number of field types, overhead associated with transmitting RNR's may be reduced. For example, a channelization IE may provide a broader site channel list (not limited to neighbor APs) while omitting overhead of extra information of a conventional RNR (e.g., BSSID, TBTT, etc.). As one result, a non-ML capable CD receiving a channelization IE may not be required to update channel scan lists as frequently since the channelization IE covers a broader site range as compared to conventional RNRs. Moreover, a channelization IE may also be modified for non-ML capable CDs by omitting MLD bitmap(s) of ML capable APs to further reduce overhead in a local site.

Figure 3:
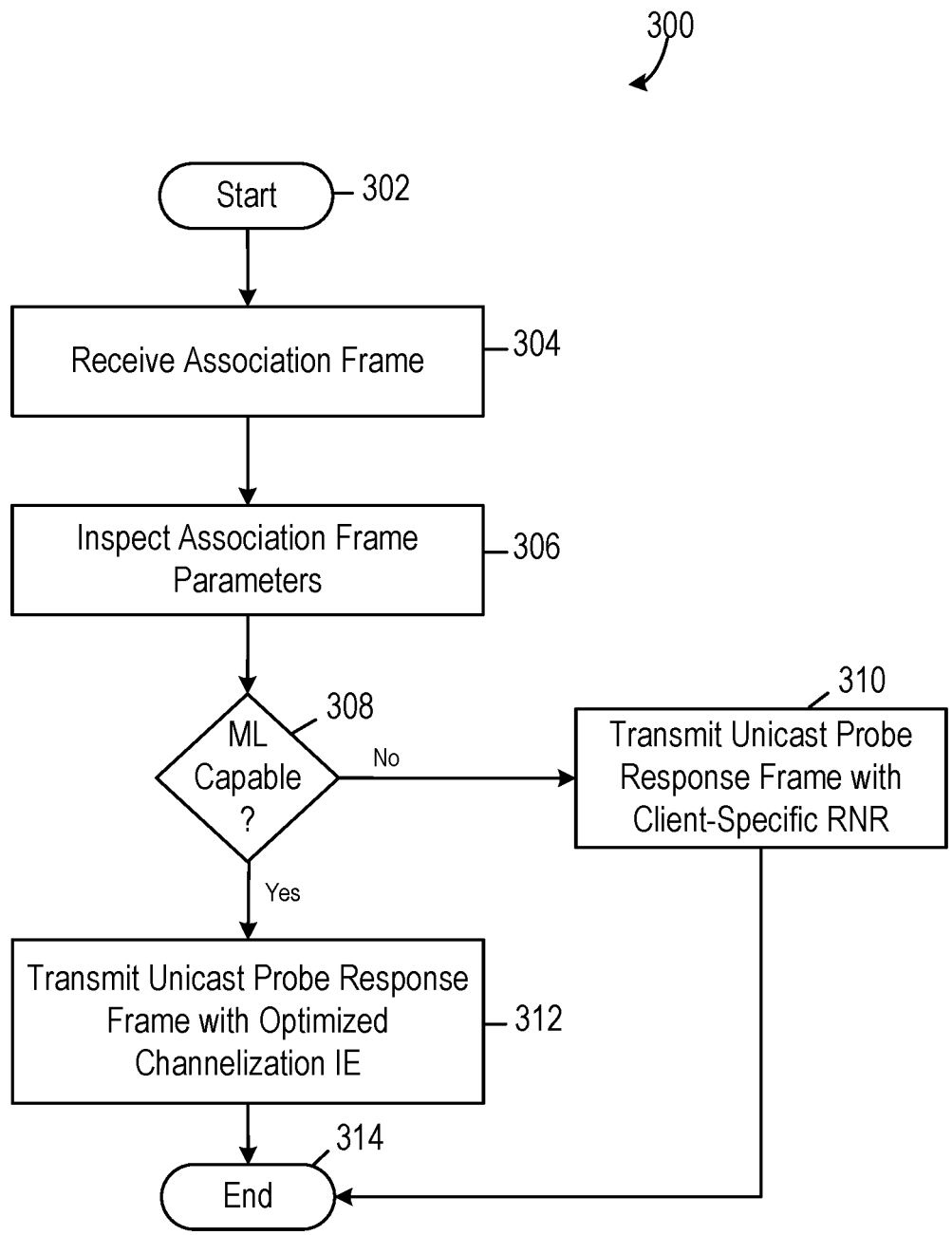
FIG. 3 is a flow chart of another method for optimizing AP neighbor discovery for CDs in a local site.

FIG. 3 is a flow chart setting forth the general stages involved in another method 300 for optimizing AP neighbor discovery for CDs in a local site (e.g., wireless network 100) that may include one or more CDs that may or may not have ML capabilities. Method 300 may be implemented using computing device 500 (e.g., controller 132 or network management system 134) as described in more detail below with respect to FIG. 5. For example, controller 132 or network management system 134 may be used to provide one or more of client-specific RNRs and channelization IEs for CDs of wireless network 100. Ways to implement the stages of method 300 will be described in greater detail below.

Method 300 begins at block 302 and proceeds to stage 304 where method 300 operates to receive association frames from one or more CDs. For example, one or more of AP 102, AP 104, AP 106, AP 108, AP 110, AP 112, AP 114, AP 116, and AP 118 may receive association frames transmitted from one or more of CD 120, CD 122, CD 124, and CD 126 within the local site. For example, an association frame may be transmitted from a CD that includes identifying parameters (e.g., MAC address, manufacturer/model, channel(s), operating class, ML IE, etc.) of a CD (e.g., CD 120). As described above, an ML IE of an ML capable CD may carry single-radio or multi-radio capabilities of the CD including whether capabilities include STR, non-STR, ESR, SR, etc.

APs receiving association frames may forward any pertinent identification and/or operational information including ML IEs to controller 132 or network management system 134. Controller 132 or network management system 134 may enter parameters of the association frames transmitted by each CD in memory storage (e.g., database 525 of FIG. 5). For example, controller 132 or network management system 134 may store a MAC address, IP address, security context and associations, QoS contexts, an associated AP, neighbor AP(s), current channel(s) in use, an ML IE, etc. for each CD of the local site. Controller 132 or network management system 134 may use the stored information to manage traffic to and from each CD as part of maintaining seamless associations from one AP to a different AP with minimal latency.

At stage 306, method 300 inspects the association frame details to determine capabilities of each CD. For example, at stage 306, method 300 may rely on controller 132 or network management system 134 to inspect association frame parameters to determine if a CD is capable of ML operation. According to an aspect, an ML IE may be included with an association frame that carries ML capability and/or other RF capability information of an associating CD.

In one aspect, at stage 306, method 300 may use controller 132 or network management system 134 to inspect an ML IE of an association frame to identify whether a transmitting CD is ML capable and/or a type of ML RF capability. For example, at stage 306, method 300 may use network management system 134 to inspect an ML IE of an association frame to identify whether a CD is ML capable and/or has at least one of ML capability with STR capability, ML capability without STR capability, ML capability with ESR capability, and/or ML capability with SR capability. In some examples, the ML IE may be set to zero which identifies that a corresponding CD may not be ML capable (e.g., legacy capabilities).

With continuing reference to FIG. 3, at decision 308, if method 300 determines that a CD is not ML capable after inspecting the association frame parameters, method 300 proceeds to stage 310 and transmits, as unicast, an association response frame that includes a client-specific RNR tailored for a particular CD based in part on the association frame parameters and method 300 then ends at 314. For example, at 310, method 300 may utilize an AP that is associated with a CD to transmit, as unicast, an association response frame that includes a client-specific RNR to the CD. In some aspects, a client-specific RNR includes AP discovery information based on the received association frame parameters (e.g., operational class, ML capability, number of radios, etc.) and/or a likelihood that the CD may associate with a neighbor AP. A likelihood of association may be based on multiple factors including a current location of a CD, a trajectory of the CD, an operational state of the CD, association history, etc.

According to an aspect, a client-specific RNR may be tailored to include one or more of a BSSID, a TBTT, and frequency information of a different frequency band of a neighbor AP based on a likelihood of the associating with the neighbor AP using the different frequency band. For example, a CD currently associated with an AP on the 5 GHz frequency band may receive a client-specific RNR that includes a BSSID, TBTT, and relevant channel information of a neighbor AP operating in the 6 GHz frequency band.

The CD may use the client-specific RNR to reduce an amount of time to scan channels of the 6 GHz frequency band since the channel information of the 6 GHz frequency band is included in the client-specific RNR. In some aspects, a client-specific RNR may be further tailored for a particular CD based on at least one of a QBSS of at least one neighbor AP, a current traffic distribution of the at least one neighbor AP, a configured data rate of the at least one neighbor AP, and QoS requirements of the particular CD.

With continued reference to FIG. 3 at decision 308, if method 300 determines that a CD is ML capable after inspecting the association frame parameters, method 300 proceeds to stage 312 and transmits, as unicast, an association response frame that may include an optimized channelization IE tailored for the ML capable CD, before method 300 ends at stage 314. For example, at stage 312, method 300 may utilize an AP that is associated with the ML capable CD to transmit, as unicast, an association response frame with an optimized channelization IE tailored according to the capabilities of the ML capable CD (see FIG. 4 for example).

In some aspects, method 300 may use the network management system 134 or controller 132 to compile the optimized channelization IE for a unicast transmission to the ML capable CD. According to an aspect, an optimized channelization IE may include embedded channel information comprising at least one of: a channel list that identifies channels of a first frequency band and an ML channel bitmap for the first frequency band; a channel list that identifies channels of a second frequency band and an ML channel bitmap for the second frequency band; or a channel list that identifies channels of a third frequency band and an ML channel bitmap for the third frequency band. A channelization IE may be representative of a plurality of APs having the same or differing capabilities in the local site. According to an aspect, method 300 may tailor an optimized channelization IE for an ML capable CD to provide frequency separation between supported channels to reduce co-channel interference between the supported channels when the ML capable CD includes at least one of multi-radio with STR capability or without STR capability.

As described above with reference to method 300, in some aspects, controller 132 or network management system 134 may provide either a client-specific RNR or a channelization IE to a CD based on ML capability of the CD (e.g., provide a client-specific RNR if not ML capable and a channelization IE if ML capable).

In other aspects, controller 132 or network management system 134 may dynamically provide one or more of a client-specific RNR and a channelization IE to particular CDs. For example, controller 132 or network management system 134 may provide a client-specific RNR and a channelization IE to an ML capable CD to account for directional motion and likelihood of associating to an ML capable AP of a local site. In some aspects, controller 132 or network management system 134 may provide a client-specific RNR to an ML capable CD to provide more details about neighboring BSSs in range of the ML capable CD. For example, a single-radio ML capable CD may benefit from using a client-specific RNR during roaming operations to gain insight about a neighboring AP's TBTT alignment.

In other aspects, controller 132 or network management system 134 may provide a non-ML capable CD with a channelization IE in addition or alternatively to a client-specific RNR. Since a channelization IE may be provided to include a limited number of field types, overhead associated with transmitting RNR's may be reduced. For example, a channelization IE provides a broader site channel list (not limited to neighbor APs) while omitting overhead of extra information of a conventional RNR (e.g., BSSID, TBTT, etc.). As one result, a non-ML capable CD receiving a channelization IE may not be required to update channel scan lists as frequently since the channelization IE covers a broader site range as compared to conventional RNRs. Moreover, a channelization IE may also be modified for non-ML capable CDs by omitting MLD bitmap(s) of ML capable APs to further reduce overhead in a local site.

FIG. 4 depicts an exemplary channelization IE 400 tailored for a ML capable CD. Channelization IE 400 may be tailored for a CD, such as CD 120, based on one or more operating classes supported by the CD and ML capability information (e.g., whether the CD is ML capable or not). For example, for each operating class supported by the CD, a channel list may be provided indicating which channels of the operating class are being used in a local site. If the CD is ML capable, a bitmap may also be included indicating which of the channels in the list support ML operations. For the example of FIG. 4, CD 120 for which channelization IE 400 is tailored may support three operating classes (e.g., 2.4 GHz, 5 GHz, and 6 GHz frequency bands) and may be ML capable. Additionally, within the local site one or more APs, such as AP 102, AP 108, and AP 114 in wireless network 100, for example, may include ML capabilities and thus ML operations may be supported on channels over which AP 102, AP 108, and AP 114 operate.

Exemplary channelization IE 400 includes an Element Identifier (ID) field 402, a Length field 404, an Element ID Extension field 406, a first Operating Class field 408, a Channel List field 410 for the first Operating Class, an ML Device (MLD) bitmap field 412 for the first Operating Class, a second Operating Class field 414, a Channel List field 416 for the second Operating Class, an MLD bitmap field 418 for the second Operating Class, a third Operating Class field 420, a Channel List field 422 for the third Operating Class, and an MLD bitmap field 424 for the third Operating Class.

According to the exemplary channelization IE 400, channels within each of the operating classes (e.g., 2.4 GHz, 5 GHz, and 6 GHz) are supported by one or more APs within the local site. Additionally, channels having an asterisk (e.g., "*") in Channel List Fields 410, 416, 422 reflect that the local site includes one or more ML capable APs that support these channels. As shown by the example of FIG. 4, Channel List field 410 for the first (e.g., 2.4 GHz) Operating Class of channelization IE 400 identifies channel 1 as being supported by one or more ML capable APs, Channel List field 416 for the second (e.g., 5 GHz) Operating Class identifies channels 40 and 52 as being supported by one or more ML capable APs, and Channel List field 422 for the third (e.g., 6 GHz) Operating Class identifies channel 37 as being supported by one or more ML capable APs.

MLD bitmap fields 412, 418, and 424 correspond to the respective Channel List Fields 410, 416, 422 for the first Operating Class, second Operating Class, and third Operating class to indicate which channels are supported by at least one ML capable AP. A value of 1 may be provided if the channel is supported by at least one ML capable AP, otherwise a value of 0 may be provided. As shown in the example of FIG. 4, MLD bitmap field 412 is set to (1, 0, 0) reflecting that channel 1 supports ML operations while channels 6 and 11 do not, MLD bitmap field 418 is set to (0, 1, 1 . . . ) reflecting that channels 40 and 52 support ML operations while channel 36 does not, and MLD bitmap field 424 is set to (0, 1, 0 . . . ) reflecting that channel 37 supports ML operations while channels 25 and 61 do not.

By transmitting, as unicast, channelization IE 400 to an ML capable CD, an amount of time required by the ML capable CD to scan for or associate with a new AP may be reduced since the ML capable CD is able to prioritize scanning and association operations using channels of ML capable APs that maximize performance. Additionally, since the channelization IE 400 includes a limited number of field types, overhead associated with transmitting channelization IE 400 may be reduced. For example, channelization IE 400 provides a broader site channel list (not limited to neighbor APs) while removing overhead associated with extra information included in a conventional RNR (e.g., BSSID, TBTT, etc.). Accordingly, CDs receiving channelization IE 400 may not be required to update channel scan lists as frequently since channelization IE 400 covers a broader site range as compared to conventional RNRs. Depending on the capabilities of each CD, additional or fewer fields may be included with channelization IE 400. For example, if a CD does not support 6 GHz frequencies, the third Operating Class field 420, Channel List field 422 for the third Operating Class, and ML Device (MLD) bitmap field 424 may not be included in channelization IE 400.

If a local site does not include ML capable APs, MLD bitmap fields may be omitted further reducing overhead associated with transmitting channelization IE 400 to a CD. Channelization IE 400 may also be modified for CDs that are incapable of ML operation by omitting MLD bitmap field(s). In another aspect, channelization IE 400 may not be tailored for a particular CD but rather may be included in beacons to broadcast embedded discovery information of a local site. For example, channelization IE 400 may be provided that includes all operating classes supported by APs in a local site or may be limited to discovery information of a smaller localized RF neighborhood (e.g. neighboring APs only).

Figure 5:
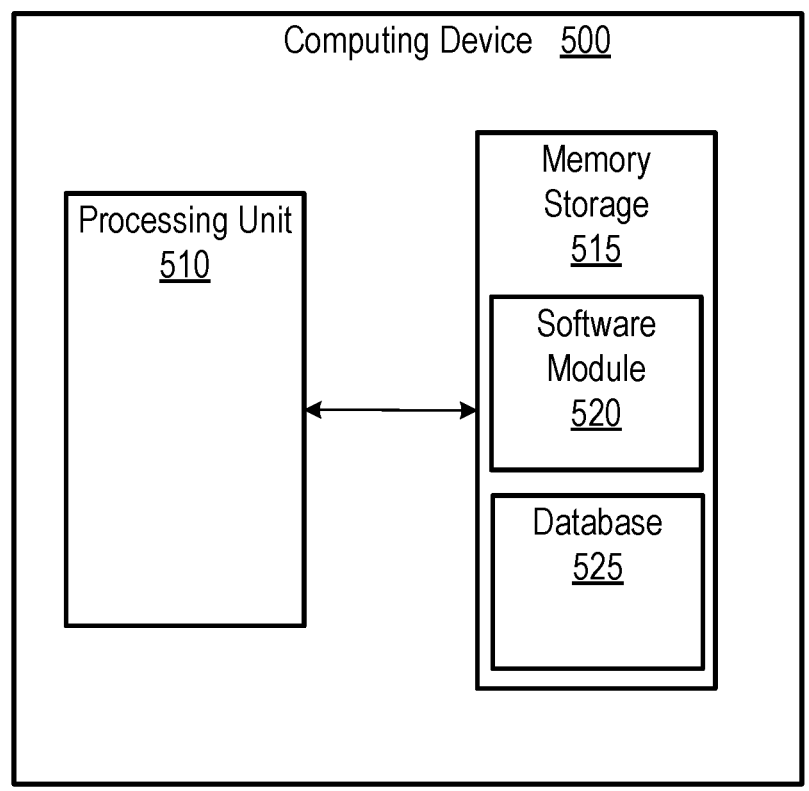
FIG. 5 is a block diagram of a computing device.

FIG. 5 shows computing device 500. As shown in FIG. 5, computing device 500 may include a processing unit 510 and a memory unit 515. Memory unit 515 may include a software module 520, database 525, and additional logic. While executing on processing unit 510, software module 520 may perform, for example, processes for optimizing AP neighbor discovery for CDs in a local site as described herein. Computing device 500, for example, may provide an operating environment for controller 132, network management system 134, AP 102, AP 104, AP 106, AP 108, AP 110, AP 112, AP 114, AP 116, AP 118, CD 120, CD 122, CD 124, CD 126, etc. Other operational environments may be utilized, and the present disclosure is not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
a processing unit; and
memory that includes instructions which, when executed by the processing unit operate to:
receive a probe frame or an association frame that identifies at least one operating class and Multi-Link (ML) capability information from a Client Device (CD) operating in a local site;
tailor a client-specific channelization Information Element (IE) for the CD, the client-specific channelization IE for the CD comprising channel information of at least one channel of at least one ML capable Access Point (AP) in the local site based on at least one operating class, the ML capability information received from the CD, and a likelihood of the CD associating with the at least one ML capable AP, wherein the likelihood of association is determined based on a trajectory of the CD and one or more of a current location of the CD, an operational state of the CD, and an association history;
embed the channelization IE in a probe response frame or in an association response frame; and
transmit, as unicast to the CD, the probe response frame or the association response frame that includes the channel information of the at least one ML capable AP in the local site.

2. The system of claim 1, wherein the processing unit is further caused to tailor the channel information of the channelization IE for the at least one ML capable AP in the local site to provide frequency separation between multiple channels of the at least one ML capable AP when the CD includes at least one of multiple radios with Simultaneous Transmit and Receive (STR) capability and multiple radios without STR capability.

3. The system of claim 1, wherein the processing unit is further caused to:
when the CD is ML capable, embed the channel information in the channelization IE to include a channel list that identifies at least one channel of a first frequency band and an ML channel bitmap for the first frequency band in the probe response frame or in the association response frame, wherein the first frequency band corresponds to the at least one operating class received from the ML capable CD in the probe frame or the association frame, and the ML channel bitmap indicates one or more channels that support ML operations in the first frequency band.

4. The system of claim 3, wherein the channel list further identifies at least one channel of a second frequency band and an ML channel bitmap for the second frequency band in the probe response frame or in the association response frame, wherein the second frequency band corresponds to the at least one operating class received from the ML capable CD in the probe frame or the association frame, and the ML channel bitmap indicates one or more channels that support ML operations in the second frequency band.

5. The system of claim 4, wherein the channel list further identifies at least one channel of a third frequency band and an ML channel bitmap for the third frequency band in the probe response frame or in the association response frame, wherein the third frequency band corresponds to the at least one operating class received from the ML capable CD in the probe frame or the association frame, and the ML channel bitmap indicates one or more channels that support ML operations in the third frequency band.

6. The system of claim 1, wherein the processing unit is further caused to transmit, as unicast to the CD, a probe response frame that includes a client-specific Reduced Neighbor Report (RNR) or an association response frame that includes the client-specific RNR, wherein the client-specific RNR is tailored to include at least one of a Basic Service Set Identifier (BSSID), a Target Beacon Transmission Time (TBTT), or frequency information of a different frequency band of a neighbor AP based on the likelihood of the CD associating with the neighbor AP using the different frequency band.

7. The system of claim 6, wherein the processing unit is further caused to enhance the client-specific RNR based on at least one of a Quality of Service Basic Service Set (QBSS) of at least one neighbor AP, a current traffic distribution of the at least one neighbor AP, a configured data rate of the at least one neighbor AP, or Quality of Service (QoS) requirements of the CD.

8. A method comprising:
  receiving a probe frame or an association frame that identifies at least one operating class and Multi-Link (ML) capability information from a Client Device (CD) operating in a local site;
  tailoring a client-specific channelization Information Element (IE) for the CD, the client-specific channelization IE for the CD comprising channel information of at least one channel of at least one ML capable Access Point (AP) in the local site based on at least one operating class and the ML capability information received from the CD and a likelihood of the CD associating with the at least one ML capable AP, wherein the likelihood of association is determined based on a trajectory of the CD and one or more of a current location of the CD, an operational state of the CD, and an association history;
  embedding the channelization IE in a probe response frame or in an association response frame; and
  transmitting, as unicast to the CD, the probe response frame or the association response frame that includes the channel information of the at least one ML capable AP in the local site.

9. The method of claim 8, further comprising tailoring the channel information of the channelization IE for the at least one ML capable AP in the local site to provide frequency separation between multiple channels of the at least one ML capable AP when the CD includes at least one of multiple radios with Simultaneous Transmit and Receive (STR) capability and multiple radios without STR capability.

10. The method of claim 8, further comprising:
  when the CD is ML capable, embedding the channel information in the channelization IE to include a channel list that identifies at least one channel of a first frequency band and an ML channel bitmap for the first frequency band in the probe response frame or in the association response frame, wherein the first frequency band corresponds to the at least one operating class received from the ML capable CD in the probe frame or the association frame, and the ML channel bitmap indicates one or more channels that support ML operations in the first frequency band.

11. The method of claim 10, wherein the channel list further identifies at least one channel of a second frequency band and an ML channel bitmap for the second frequency band in the probe response frame or in the association response frame, wherein the second frequency band corresponds to the at least one operating class received from the ML capable CD in the probe frame or the association frame, and the ML channel bitmap indicates one or more channels that support ML operations in the second frequency band.

12. The method of claim 11, wherein the channel list further identifies at least one channel of a third frequency band and an ML channel bitmap for the third frequency band in the probe response frame or in the association response frame, wherein the third frequency band corresponds to the at least one operating class received from the ML capable CD in the probe frame or the association frame, and the ML channel bitmap indicates one or more channels that support ML operations in the third frequency band.

13. The method of claim 8, further comprising transmitting, as unicast to the CD, a probe response frame that includes a client-specific Reduced Neighbor Report (RNR) or an association response frame that includes the client-specific RNR, wherein the client-specific RNR is tailored to include at least one of a Basic Service Set Identifier (BSSID), a Target Beacon Transmission Time (TBTT), or frequency information of a different frequency band of a neighbor AP based on the likelihood of the CD associating with the neighbor AP using the different frequency band.

14. The method of claim 13, further comprising enhancing the client-specific RNR based on at least one of a Quality of Service Basic Service Set (QBSS) of at least one neighbor AP, a current traffic distribution of the at least one neighbor AP, a configured data rate of the at least one neighbor AP, or Quality of Service (QoS) requirements of the CD.

15. A non-transitory computer-readable medium that stores a set of instructions which when executed by a processing unit perform a method executed by the set of instructions comprising:
  receiving a probe frame or an association frame that identifies at least one operating class and Multi-Link (ML) capability information from a Client Device (CD) operating in a local site;
  tailoring a client-specific channelization Information Element (IE) for the CD, the client-specific channelization IE for the CD comprising channel information of at least one channel of at least one Access Point (AP) having ML capability in the local site based on at least one operating class and the ML capability information received from the CD and a likelihood of the CD associating with the at least one ML capable AP, wherein the likelihood of association is determined based on a trajectory of the CD and one or more of a current location of the CD, an operational state of the CD, and an association history;

embedding the channelization IE in a probe response frame or in an association response frame based on the at least one operating class and the ML capability information of the CD; and transmitting, as unicast to the CD, the probe response frame or the association response frame that includes the channel information of the at least one AP having ML capability in the local site.

16. The non-transitory computer-readable medium of claim 15, further comprising:

when the CD is ML capable, embedding at least one of:
channel information in the channelization IE to include a channel list that identifies at least one channel of a first frequency band and an ML channel bitmap for the first frequency band in the probe response frame or in the association response frame, wherein the first frequency band corresponds to the at least one operating class received from the ML capable CD in the probe frame or the association frame, and the ML channel bitmap indicates one or more channels that support ML operations in the first frequency band.

17. The non-transitory computer-readable medium of claim 15, further comprising transmitting, as unicast to the CD, the probe response frame that includes a client-specific Reduced Neighbor Report (RNR) or the association response frame that includes the client-specific RNR, wherein the client-specific RNR is tailored to include at least one of a Basic Service Set Identifier (BSS ID), a Target Beacon Transmission Time (TBTT), or frequency information of a different frequency band of a neighbor AP based on the likelihood of the CD associating with the neighbor AP using the different frequency band.

18. The non-transitory computer-readable medium of claim 17, further comprising enhancing the client-specific RNR based on at least one of a Quality of Service Basic Service Set (QBSS) of at least one neighbor AP, a current traffic distribution of the at least one neighbor AP, a configured data rate of the at least one neighbor AP, or Quality of Service (QoS) requirements of the CD.

19. The non-transitory computer-readable medium of claim 15, further comprising tailoring the channel information of the channelization IE for the at least one ML capable AP in the local site to provide frequency separation between multiple channels of the at least one ML capable AP when the CD includes at least one of multiple radios with Simultaneous Transmit and Receive (STR) capability and multiple radios without STR capability.

20. The non-transitory computer-readable medium of claim 16, wherein the channel list further identifies:

at least one channel of a second frequency band and an ML channel bitmap for the second frequency band in the probe response frame or in the association response frame, wherein the second frequency band corresponds to the at least one operating class received from the ML capable CD in the probe frame or the association frame, and the ML channel bitmap indicates one or more channels that support ML operations in the second frequency band; and at least one channel of a third frequency band and an ML channel bitmap for the third frequency band in the probe response frame or in the association response frame, wherein the third frequency band corresponds to the at least one operating class received from the ML capable CD in the probe frame or the association frame, and the ML channel bitmap indicates one or more channels that support ML operations in the third frequency band.

* * * * *